United States Patent
Na et al.

(10) Patent No.: US 8,583,879 B2
(45) Date of Patent: Nov. 12, 2013

(54) DATA STORAGE DEVICE, STORING MEDIUM ACCESS METHOD AND STORING MEDIUM THEREOF

(75) Inventors: Se-wook Na, Suwon-si (KR); In Sik Ryu, Suwon-si (KR)

(73) Assignee: Seagate Technology International, Grand Cayman (KY)

( * ) Notice: Subject to any disclaimer, the term of this patent is extended or adjusted under 35 U.S.C. 154(b) by 256 days.

(21) Appl. No.: 13/023,153

(22) Filed: Feb. 8, 2011

(65) Prior Publication Data

US 2011/0197035 A1 Aug. 11, 2011

(51) Int. Cl.
*G06F 12/10* (2006.01)

(52) U.S. Cl.
USPC ........... 711/154; 711/112; 711/170; 711/202; 711/203; 711/206

(58) Field of Classification Search
USPC ............... 711/112, 154, 170, 202–203, 206
See application file for complete search history.

(56) References Cited

U.S. PATENT DOCUMENTS

| | | |
|---|---|---|
| 6,185,063 B1 | 2/2001 | Cameron |
| 8,019,925 B1* | 9/2011 | Vogan et al. ............ 711/4 |
| 2007/0019320 A1* | 1/2007 | Cho ...................... 360/75 |
| 2007/0260845 A1* | 11/2007 | Kita ..................... 711/203 |
| 2009/0172246 A1* | 7/2009 | Afriat ................... 711/103 |

FOREIGN PATENT DOCUMENTS

| | | |
|---|---|---|
| JP | 2001-125750 | 5/2001 |
| JP | 2007-073138 | 3/2007 |
| KR | 10-2005-0031423 A | 4/2005 |

* cited by examiner

*Primary Examiner* — Jasmine Song
(74) *Attorney, Agent, or Firm* — Cesari and Reed, LLP; Kirk A. Cesari; Christian W. Best (57) ABSTRACT

A data storage device including a storing medium to shingle write and a controller to access the storing medium so that data is sequentially written on the storing medium using a mapping table based on Logical Block Address (LBA) included in a write command.

16 Claims, 10 Drawing Sheets

MAPPING TABLE 225

| LBA (RECEIVED WITH WRITE COMMAND) 225a | SECTOR LAST WRITTEN 225b | TRACK 225c | UNIT 225d | ZONE 225e | LBA TO BE UPDATED 225f |
|---|---|---|---|---|---|
| ⋮ | ⋮ | ⋮ | ⋮ | ⋮ | ⋮ |
| LBA (RECEIVED WITH WRITE COMMAND) | SECTOR LAST WRITTEN | TRACK | UNIT | ZONE | LBA TO BE UPDATED |

FIG. 5

| SN0 | SN1 | SN2 | SN3 | SN4 |
|-----|-----|-----|-----|-----|
| 7 | 2 | 14 | 4 | 9 |

TRACK 1

| SN5 | SN6 | SN7 | SN8 | SN9 |
|-----|-----|-----|-----|-----|
| 5 | 3 | 12 | 8 | |

TRACK 2

| SN10 | SN11 | SN12 | SN13 | SN14 |
|------|------|------|------|------|
| | | | | |

TRACK 3

NUMBER OF SECTOR ON WHICH DATA IS LASTLY WRITTEN

FIG. 6

| SN0 | SN1 | SN2 | SN3 | SN4 |
|-----|-----|-----|-----|-----|
| 7 | 2 | 14 | 4 | 9 |

TRACK 1

| SN5 | SN6 | SN7 | SN8 | SN9 |
|-----|-----|-----|-----|-----|
| 5 | 3 | 12 | 8 | 2 |

TRACK 2

| SN10 | SN11 | SN12 | SN13 | SN14 |
|------|------|------|------|------|
| 3 | | | | |

TRACK 3

DATA STORAGE DEVICE, STORING MEDIUM ACCESS METHOD AND STORING MEDIUM THEREOF

CROSS-REFERENCE TO RELATED APPLICATIONS

This application claims priority under 35 U.S.C. §119(a) the benefit of Korean Patent Application No, 10-2010-0011475, filed on Feb. 8, 2010, in the Korean Intellectual Property Office, the disclosure of which is incorporated herein in its entirety by reference.

BACKGROUND

1. Field of the Invention

The present general inventive concept relates to a data storage device and a controlling method thereof, and, more particularly, to a data storage device to shingle write and a controlling method thereof.

2. Description of the Related Art

An example of a data storage device is a Hard Disk Drive (HDD). Recently, a hybrid data storage device including a plurality of data storage devices to increase a storage amount has been developed. The plurality of data storage devices may include a HDD.

A data storage device or a hybrid data storage device performs an access operation for writing or reading data on or from a storing medium according to a command of a host connected thereto. An access operation based on shingle write is also an access operation to a storing medium. According to shingle write, data is recorded while partially overlapping a neighboring track. That is, shingle write is data write technology of efficiently operating a storage space of a storing medium by partially overwriting a first track when writing is performed on a second track neighboring to the first track and partially overwriting the second track when writing is performed on a third track neighboring to the second track.

However, based on shingle write, when random write is performed on a storing medium or when data recorded on the storing medium is updated, rewrite of a neighboring track may occur according to a recording position of a Logical Block Address (LBA) included in a write command, thereby decreasing an access performance in the storing medium.

SUMMARY

The present general inventive concept can provide a data storage device to access a data storing medium in shingle write, a storing medium access method, and a storing medium thereof.

The present general inventive concept can also provide a data storage device to manage metadata of a data storing medium in shingle write, a storing medium access method, and a storing medium thereof.

Additional features and utilities of the present general inventive concept will be set forth in part in the description which follows and, in part, will be obvious from the description, or may be learned by practice of the present general inventive concept.

Exemplary embodiments of the present general inventive concept can provide a data storage device including a storing medium to perform a shingle write, and a controller to access the storing medium so that data is sequentially written on the storing medium using a mapping table based on a Logical Block Address (LBA) included in a write command.

The mapping table may include current data recording state information of the storing medium and mapping information of the LBA.

The controller may allocate a virtual address to the LBA using the mapping table and access the storing medium using the allocated virtual address, and the mapping information of the LBA may include mapping information between the LBA and the virtual address.

The controller may allocate the virtual address to sequentially write data of a currently received LBA using the mapping table, and may update the mapping table to invalidate an already allocated virtual address if the already allocated virtual address to the currently received LBA exists in the mapping table.

The controller may manage the mapping table by zone, where a zone may include a plurality of units, a unit may include a plurality of tracks, a track may include a plurality of sectors, and the virtual address may be allocated based on a sector.

When the data storage device is in an idle time, the controller may rewrite valid data written on at least one unit on a new unit using the mapping table and update the mapping table, and the controller may rewrite the data in the order of LBAs. The at least one unit may be a unit of which a count value of invalid sectors is greater than a predetermined critical value.

Exemplary embodiments of the present general inventive concept may also provide a storing medium access method including searching a mapping table based on Logical Block Address (LBA) included in a received write command, and accessing a storing medium so that data is sequentially written on the storing medium based on the mapping table. The mapping table may include current data recording state information of the storing medium, and mapping information of the LBA.

The accessing of the storing medium may include allocating a virtual address to the LBA using the mapping table and accessing the storing medium using the allocated virtual address. The mapping information of the LBA may include mapping information between the LBA and the virtual address.

The accessing of the storing medium may further include checking after allocating the virtual address whether an already allocated virtual address to the LBA exists in the mapping table, when the already allocated virtual address to the LBA exists in the mapping table, invalidating the already allocated virtual address, and updating the mapping table.

The storing medium access method may further include managing the mapping table by zone, where a zone includes a plurality of units, a unit includes a plurality of tracks, a track includes a plurality of sectors, and the virtual address is allocated based on a sector.

The storing medium access method may further include when a data storage device is in an idle time, rewriting valid data written on at least one unit on a new unit using the mapping table, and updating the mapping table after rewriting the valid data.

The rewriting of the valid data may include rewriting the valid data in the order of LBAs, and when the valid data is rewritten, the at least one unit may be a unit of which a count value of invalid sectors is greater than a predetermined critical value.

Exemplary embodiments of the present general inventive concept may also provide a non-transitory computer readable medium including a computer readable program thereon that when executed by a computer performs a storing medium access method, the method including searching a mapping table based on a Logical Block Address (LBA) included in a received write command, and accessing a storing medium so that data is sequentially written on the storing medium based on the mapping table.

Exemplary embodiments of the present general inventive concept also provide a data storage device including a data storage medium to shingle write, and a controller to access the data storage medium, the controller having a first processor to receive a command from a host and to extract a Logical Block Address (LBA) from the received command, a second processor to allocate a virtual address (VA) to the received LBA using a mapping table, and a third processor to access the data storage medium by a conversion of the allocated VA to a real address.

The third processor of the data storage device may include a read and write channel circuit to access the data storage medium.

The second processor of the data storage device that allocates the VA to the LBA can invalidate, validate, or activate sectors and units of the data storage medium using at least one of a free queue, an allocation queue, and a garbage queue.

The data storage may also include where the mapping table used by the second processor is metadata of the data storage medium.

Exemplary embodiments of the present general inventive concept may also provide a storing medium access method of a data storage device, the method including receiving a command from a host and extracting a Logical Block Address (LBA) from the received command with a first processor of the data storage device, allocating a virtual address (VA) to the received LBA using a mapping table with a second processor of the data storage device, and accessing a data storage medium of the data storage device by converting the allocated VA to a real address with a third processor of the data storage device.

The allocating the VA to the LBA of the method may include invalidating, validating, or activating sectors and units of the data storage medium using at least one of a free queue, an allocation queue, and a garbage queue.

The method may include where the mapping table used by the second processor is metadata of the data storage medium.

BRIEF DESCRIPTION OF THE DRAWINGS

The above and/or other utilities of the present general inventive concept will become apparent and more readily appreciated from the following description of the exemplary embodiments, taken in conjunction with the accompanying drawings, in which.

DETAILED DESCRIPTION OF THE EMBODIMENTS

Reference will now be made in detail to the embodiments of the present general inventive concept, examples of which are Illustrated in the accompanying drawings, wherein like reference numerals refer to the like elements throughout. The embodiments are described below in order to explain the present general inventive concept by referring to the figures.

Figure 1:
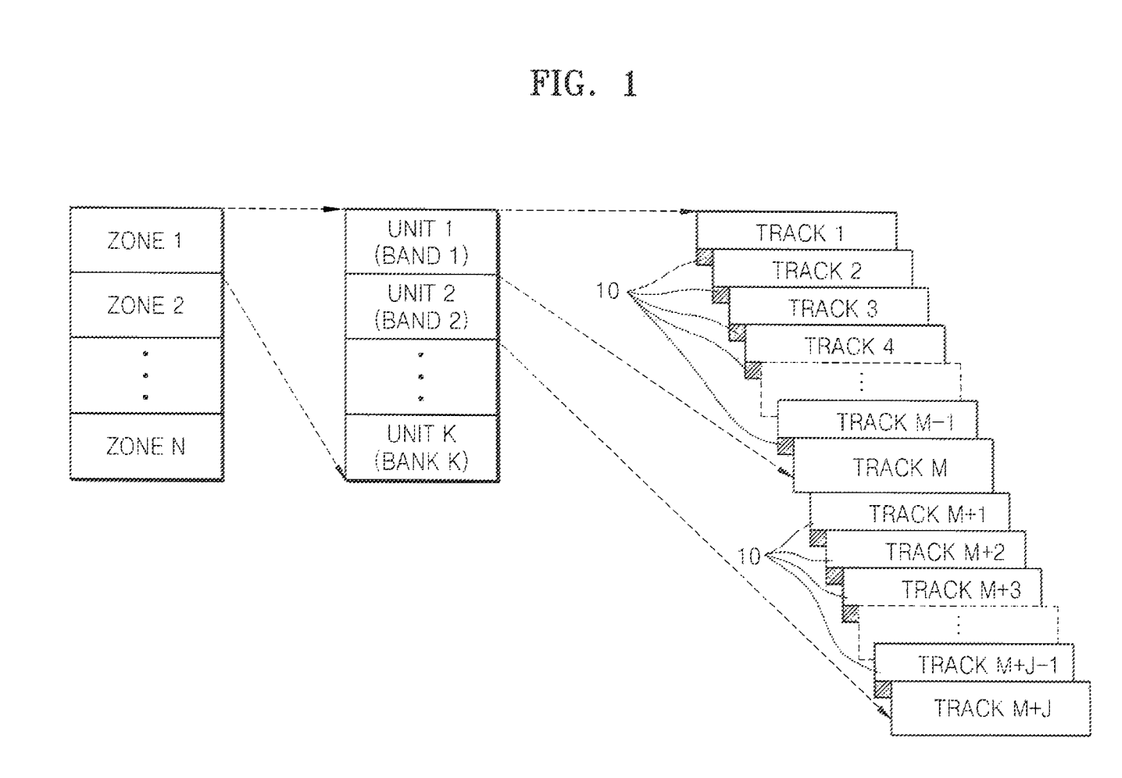
FIG. 1 illustrates a logical structure of a storing medium for writing data thereon by shingle write according to exemplary embodiments of the present general inventive concept.

FIG. 1 illustrates a logical structure of a storing medium to write data thereon by shingle write. Referring to FIG. 1, the storing medium can include N zones, each zone can include K units, each unit can include a plurality of tracks, each track can include a plurality of sectors (not illustrated). As illustrated FIG. 1, a unit 1 can include M tracks, and a unit 2 can include J tracks. M and J may be the same integer or different integers. The number of units included in each of the N zones may be the same or different from each other. A unit may be called a band.

Data can be written on tracks included in each of K units based on shingle write. Tracks 1 to M+J illustrated in FIG. 1 can be tracks on which data has been written based on shingle write. Referring to the unit 1 of FIG. 1, a track 2 can be overwritten on a partial region of a track 1, a track 3 can be overwritten on a partial region of the track 2, and a track M can be overwritten on a partial region of a track M−1. However, a track M+1, which can be a first track of the unit 2, may not be overwritten on the track M. As such, in shingle write, a first track of each unit may not be overwritten on a previous track. Reference numeral 10 of FIG. 1 denotes overwritten regions.

For the convenience of description, FIG. 1 illustrates that each track can have the same length. However, when data is written on the storing medium in the form of concentric circle on a platter like a hard disk, each track can have a different length, and/or a plurality of tracks may have different lengths, and one or more different tracks may have the same length.

Accordingly, when the storing medium is a hard disk, an outer track may include a larger number of sectors than an inner track includes. As data is written from the outer track to the inner track, the track 1 can be an outer track of the storing medium compared to the track M+J.

Although FIG. 1 illustrates that a first track is the track 1, a track number typically starts from 0 in case of a hard disk. Thus, when the storing medium is a hard disk, a first track can be defined as a track 0. Numbers of zones and units also can be defined to start from 0 when the storing medium is a hard disk. A storing medium with a structure to shingle write as illustrated in FIG. 1 is not limited to a hard disk. That is, a storing medium to carry out the shingle write as illustrated and described in the exemplary embodiments of the present general inventive concept can be applied to a storing medium such as a solid state drive (SSD), a volatile and/or non-volatile memory device, or any other suitable memory device and/or storing medium. Shingle write can be applied to write data on a storing medium including tracks. Hereinafter, although it is illustrated that each track includes the same number of sectors, the number of sectors per track may be different as described above.

Figure 2:
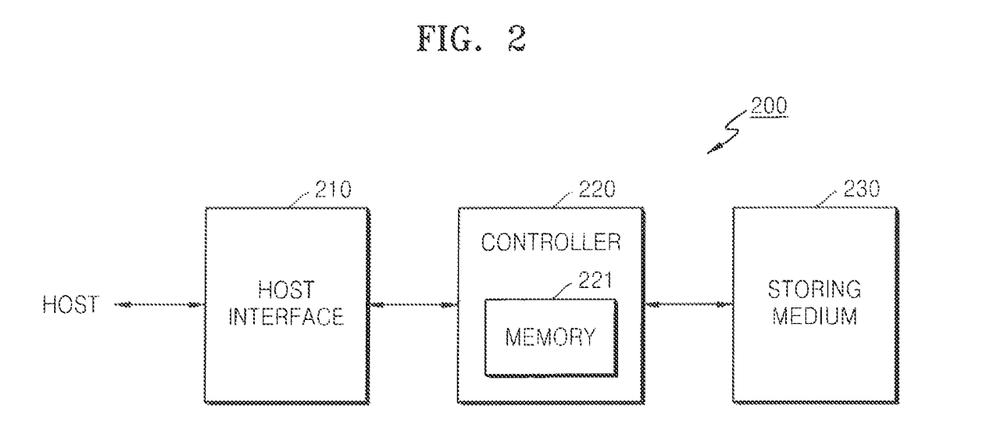
FIG. 2 is a functional block diagram illustrating a data storage device according to exemplary embodiments of the present general inventive concept.

FIG. 2 illustrates a functional block diagram of a data storage device 200 according to exemplary embodiments of the present general inventive concept. Referring to FIG. 2, the data storage device 200 can include a host interface 210, a controller 220, and a storing medium 230.

The host interface 210 can transmit data to and receive data from a host as illustrated in FIG. 2. For example, the host interface 210 can perform the data transmission and reception process according to an Integrated Device Electronics (IDE) interface standard. The host may be, for example, a device to operate according to a Microsoft® Windows® Operating System (OS) program. For example, the host may be a computer system, a server, a digital camera, a digital media player, a set-top box, a processor, a filed programmable gate array, a programmable logic device, and/or any other suitable electronic device. The host may be formed with the data storage device 200 in a single body. The host may be connected to the data storage device 200 via a wired and/or wireless communication link.

The controller 220 can store programs and data to control the data storage device 200 in a memory 221. In particular, the controller 220 can store programs and data to execute the methods illustrated in the flowcharts of FIGS. 3, 4, 7, and 9 and as described in detail below.

In shingle write based on random Logical Block Address (LBA), the controller 220 can access the storing medium 230 so that data is sequentially written on the storing medium 230 using a mapping table based on LBA included in a write command received via the host interface 210.

Figure 3:
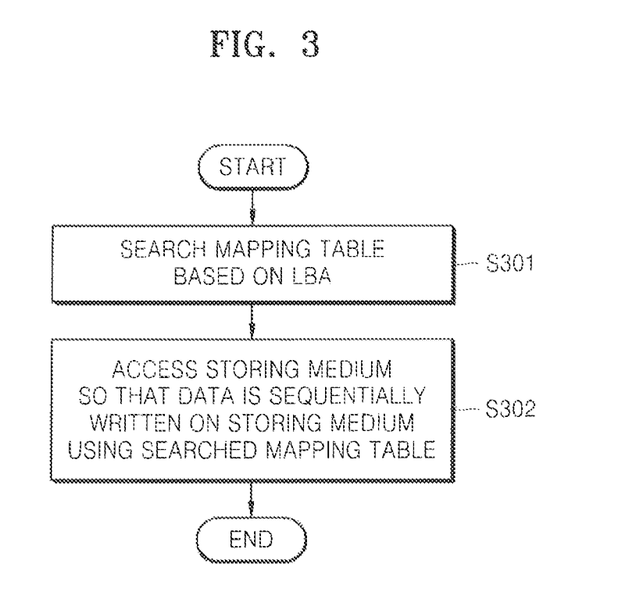
FIG. 3 is a flowchart illustrating a storing medium access method when writing data in a data storage device according to exemplary embodiments of the present general inventive concept.

That is, the controller 220 can access the storing medium 230 according to the method illustrated in the flowchart of FIG. 3 and as described in detail below. FIG. 3 illustrates a flowchart of a storing medium access method when writing data in a data storage device according to exemplary embodiments of the present general inventive concept.

Figure 3A:
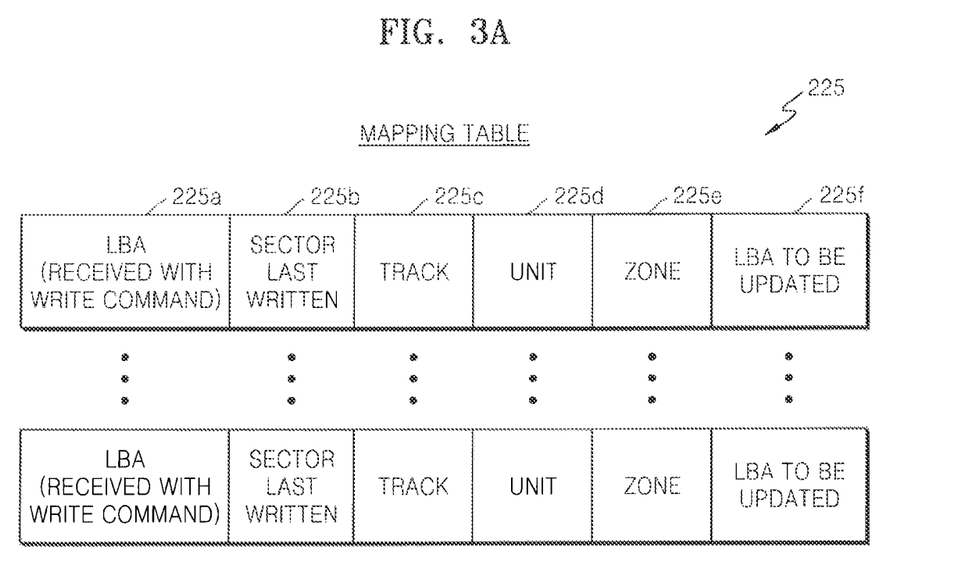
FIG. 3A illustrates a mapping table according to exemplary embodiments of the present general inventive concept.

Referring to FIGS. 3 and 3A, the controller 220 can search a mapping table 225 from the memory 221 based on a LBA (e.g., LBA 225*a*) included in a received write command in operation S301. That is, the controller 220 may receive a write command from the host via the host interface 210, and can search the mapping table (e.g., mapping table 225 illustrated in FIG. 3A) based on the LBA received with the write command (e.g., the LBA 225*a*). The mapping table 225 can be searched based on the LBA, and may include information from which a current data recording state of the storing medium 230 can be determined, and can include information which can be traced based on the LBA.

The information from which a current data recording state of the storing medium 230 can be determined may include information on the number of a sector on which data is last written (e.g., sector last written 225*b* in the mapping table 225, which can be the number of a sector on which data has most recently been written), and a track (e.g., track 225*c*), a unit (e.g., unit 225*d*), and a zone (e.g., zone 225*d*) including the sector (e.g., the sector last written 225*b* of LBA 225*a*). The information which can be traced based on the LBA may include information to determine whether a currently received LBA is a new LBA or an LBA to be updated. For example, whether the LBA 225*a* in mapping table 225 is an LBA to be updated may be indicated by item 225*f* in the mapping table 225.

The mapping table 225 may be stored in the memory 221, an external non-volatile storing medium (not illustrated) having a predetermined (e.g., fast) access time, or the quickest access position of the storing medium 230 (for example, an Outer Dimension (OD) in case of a hard disk). If the mapping table 225 is stored in the external non-volatile storing medium, the data storage device 200 of FIG. 2 can include a storing medium that is outside the controller 220 and that is separate from the storing medium 230.

If the mapping table 225 is stored in the external non-volatile storing medium or the storing medium 230, the controller 220 can swap between a mapping table per zone stored in the external non-volatile storing medium or the storing medium 230 and a mapping table stored in the memory 221 so that a mapping table of at least two zones to which the most recently accessed LBA of the storing medium 230 belongs is stored in the memory 221.

The controller 220 can access the storing medium 230 in operation S302 so that data can be sequentially written in the storing medium 230 using the searched mapping table.

Figure 4:
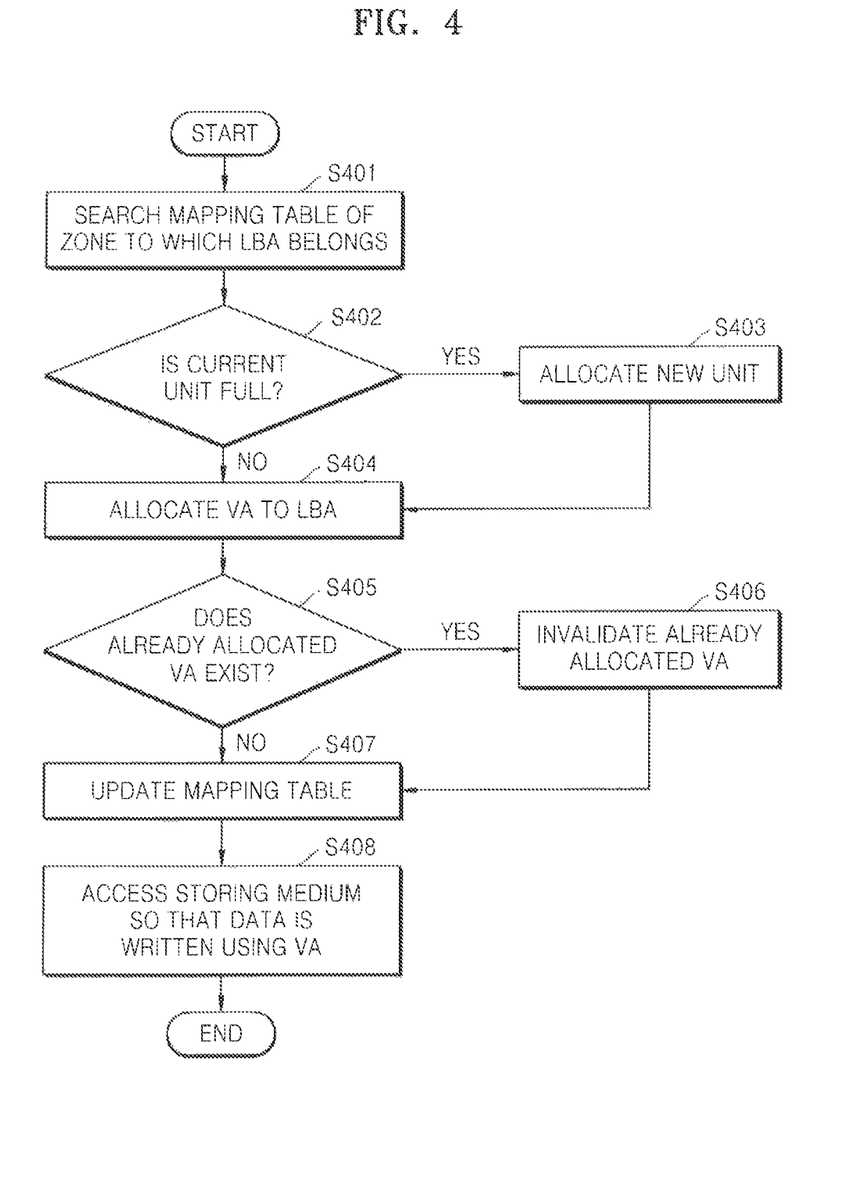
FIG. 4 is a detailed flowchart illustrating the storing medium access method illustrated in FIG. 3 according to exemplary embodiments of the present general inventive concept.

In more detail, the controller 220 can access the storing medium 230 according to the method illustrated in the flowchart of FIG. 4 and as described in detail below. FIG. 4 is a detailed flowchart of the storing medium access method illustrated in FIG. 3.

Referring to FIG. 4, the controller 220 can search a mapping table of a zone to which an LBA included in a received write command belongs in operation S401. The mapping table search can be performed based on an LBA as illustrated in operation S301 of FIG. 3 and described above because available LBAs per zone are previously allocated. For example, 0-1000 LBAs can be set as available LBAs for a zone 1 of FIG. 1, and 1001-2000 LBAs can be set as available LBAs for a zone 2 of FIG. 1. When the available LBAs of the zone 1 and the zone 2 are the same as described above, if the LBA included in the received write command is, for example, 5, the controller 220 can search a mapping table of the zone 1 in operation S401. The mapping table can be managed per zone or in the unit of the storing medium 230.

The mapping table can be stored in the memory 221 using the method illustrated in FIG. 3 and as described above. The mapping table can include information as described with reference to FIG. 3. That is, the mapping table can include information on the number of a sector on which data is last written (i.e., most recently written) in a zone, and can include information on a track and a unit including the sector as information from which a current data recording state of the storing medium 230 can be determined.

In more detail, the mapping table can include the number of a sector on which data is last written (i.e., most recently written), valid units, valid tracks, valid sectors, a count value of invalid sectors per unit, a count value of active units, active sectors, active tracks, and active units as information from which a current data recording state of the storing medium 230 can be determined. A valid unit, a valid track, and a valid sector can be defined as a reserved unit, a reserved track, and a reserved sector, respectively, wherein the valid unit, the valid track, the valid sector respectively mean a unit including a track including a sector in which data write is possible. That is, a valid unit can be defined as a reserved unit, a valid track can be defined as a reserved track, and a valid sector can be defined as a reserved sector when a unit that includes a track that includes a sector in which data write is possible. An active unite, an active track, and an active sector respectively can mean a unit including a track including a sector on which valid data has been written. An invalid sector can be a sector in which written data is invalid. In addition, the mapping table can include mapping information between an LBA and a Virtual Address (VA) as information to trace according to the LBA.

In operation S402, the controller 220 can determine whether a current unit is full by using the searched mapping table. That is, if the number of a sector on which data is lastly written in a zone, which is included in the mapping table, is the number of the last sector of the current unit, the controller 220 can determine that the current unit is full. When the number of a sector on which data is lastly written in a zone, which is included in the mapping table, is not the number of the last sector of the current unit, the controller 220 can determine that the current unit is not full.

If it is determined in operation S402 that the current unit is full, the controller 220 can allocate a new unit using the mapping table in operation S403. The new unit can be a valid unit on which data can be written and which can be included in the zone to which the LBA belongs.

If the current unit is not full or a new unit is allocated, the controller 220 can allocate a VA to the LBA in operation S404. The VA can be an address in the unit of valid sector of the storing medium 230 and can be determined according to the number of a sector on which data is last written (i.e., most recently written) in the current unit or the new unit allocation.

Figure 5:
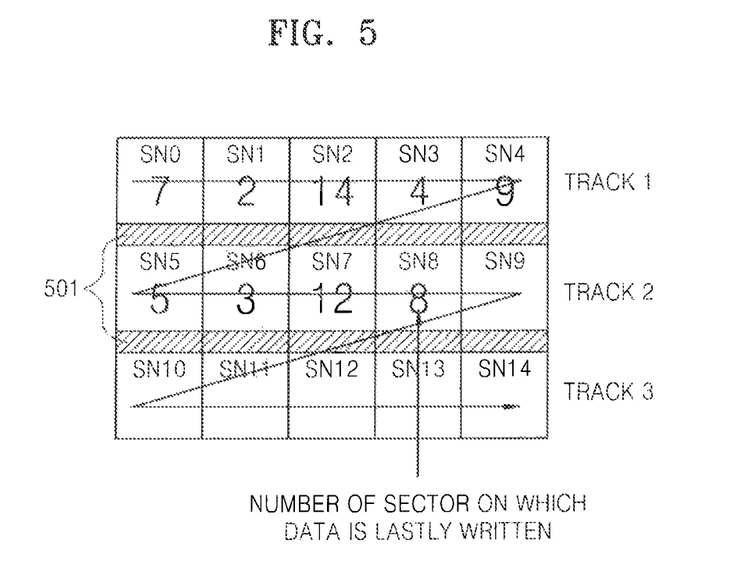
FIG. 5 illustrates sequential shingle write based on random LBA according to exemplary embodiments of the present general inventive concept.

That is, if the number of the sector on which data is last written in the current unit is a Sector Number 8 as illustrated in FIG. 5, a VA corresponding to a sector to which a SN 9 is allocated can be allocated to a currently received LBA. If a new unit is allocated, the controller 220 can allocate a VA corresponding to a first sector of the new unit to the currently received LBA. As such, a VA allocated to an LBA can depend upon a valid sector determined by the number of a sector on which data is last written in a zone to which the LBA belongs.

A VA can be defined based on an actual address of a sector. For example, when the storing medium 230 is a hard disk, a VA can be defined based on a Cylinder Head Sector (CHS). When the storing medium 230 has such a logical structure as illustrated in FIG. 1, a VA can be defined based on zone, unit, track, and sector.

FIG. 5 illustrates sequential shingle write based on a random LBA, wherein it is assumed that a single unit includes three tracks, each track including five sectors. Although the single unit illustrated in FIG. 5 has three tracks with five sectors each, the number of tracks and the corresponding number of sectors is for illustrative purposes only, and the single unit can have any suitable number of tracks and corresponding sectors to carry out the exemplary embodiments of the present general inventive concept as disclosed herein.

Referring to FIG. 5, LBAs received from a host can be in the order of 7, 2, 14, 4, 9, 5, 3, 12, and 8. If the current unit is the same as illustrated in FIG. 5, the controller 220 determines in operation S402 of FIG. 4 that the current unit is not full and allocates a VA to a currently received LBA in operation S404. In FIG. 5, an arrow indicates the order for writing data, and reference numeral 501 denotes overwritten regions.

The controller 220 can check using the mapping table in operation S405 whether a VA already allocated to the currently received LBA exists in the mapping table. That is, the controller 220 can search, based on LBA, whether mapping information between an LBA and a VA exists in a mapping table. When the mapping information exists, the controller 220 can determine that the VA already allocated to the currently received LBAs exists in the mapping table.

When it is determined that the VA already allocated to the currently received LBA exists in the mapping table, the controller 220 can invalidate the already allocated VA existing in the mapping table in operation S406 and can update the mapping table in operation S407. That is, the controller 220 can update a mapping table of a zone to which an LBA belongs to manage a sector corresponding to the already allocated VA as an invalid sector and a sector corresponding to a newly allocated VA as an active sector. A count value of invalid sectors of a unit included in the mapping table can be increased by 1. The count value of invalid sectors of a unit can be increased by 1 every time a VA corresponding to a sector included in the unit is invalidated. The number of a sector on which data is last written (i.e., most recently written), which is included in the mapping table, can be updated based on an allocated VA.

When no mapping information between the LBA and the VA exists, the controller 220 can determine that the already allocated VA to the currently received LBA does not exist in the mapping table.

When it is determined that the already allocated VA to the currently received LBA does not exist in the mapping table, the controller 220 can update the mapping table in operation S407. When the already allocated VA to the currently received LBA does not exist in the mapping table, the mapping table can include mapping information between the currently received LBA and the currently allocated VA and information to manage a sector corresponding to the currently allocated VA as an active sector. The number of a sector on which data is last written (i.e., most recently written), which is included in the mapping table, can be updated based on the currently allocated VA.

Figure 6:
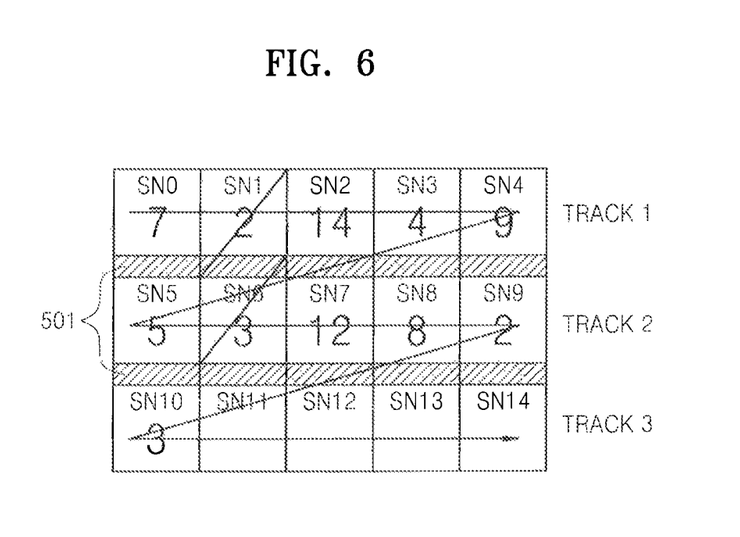
FIG. 6 illustrates shingle write in which an LBA is updated in a state where data is written as illustrated in FIG. 5 according to exemplary embodiments of the present general inventive concept.

In operation S408, the controller 220 can access the storing medium 230 so that data is written using the currently allocated VA. When an already allocated VA to the currently received LBA exists in the mapping table, data write can be performed as illustrated in FIG. 6. FIG. 6 illustrates shingle write in which an LBA is updated to a state where data is written as illustrated in FIG. 5.

Referring to FIG. 6, the LBAs 2 and 3 may have been sequentially received in a state where data had been written. The mapping table can be updated so that data of the LBAs 2 and 3 are sequentially written on sectors 9 and 10 according to the received order. Already allocated VAs corresponding to sectors 1 and 5 can be invalidated (in operation S406 as described above). A VA based on the sector 9 can be newly allocated as a VA mapped to the LBA 2 and a VA based on the sector 10 can be newly allocated as a VA mapped to the LBA 3.

When the data storage device 200 is in an idle time, the controller 220 can access the storing medium 230 to check a state of a unit using a mapping table per zone and can perform a rewrite so that data written on the storing medium 230 is rearranged.

Figure 7:
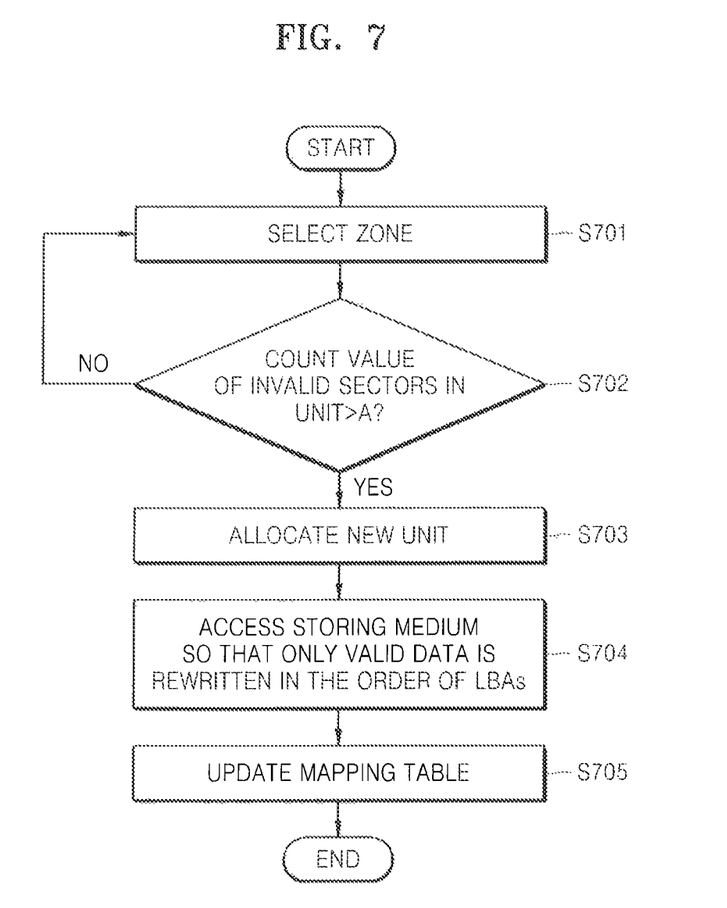
FIG. 7 is a flowchart illustrating a storing medium access method when rewriting shingle-written data in an idle time of a data storage device according to exemplary embodiments of the present general inventive concept.

That is, the controller 220 can access the storing medium 230 according to the method illustrated in the flowchart of FIG. 7. FIG. 7 illustrates a flowchart of a storing medium access method when rewriting shingle-written data in an idle time of a data storage device according to exemplary embodiments of the present general inventive concept.

Referring to FIG. 7, the controller 220 can select a zone using a mapping table in operation S701. In operation S701, the controller 220 can select a zone based on the number of invalid sectors using a mapping table per zone. That is, a zone can be selected in the order that the number of invalid sectors is greater (i.e., the order of selected zones may be from the sector with the greatest number of invalid sectors to the sector with the least number of invalid sectors). The number of invalid sectors per zone can be determined based on a count value of invalid sectors per unit described above.

When a zone is selected, the controller 220 can determine in operation S702 whether a unit of which a count value of invalid sectors is greater than a critical value A exists from among units included in the zone selected using the mapping table. The count value of invalid sectors included in the mapping table can be updated every time an LBA is updated as described with reference to FIG. 6, or may be updated at predetermined periods of time. The critical value A can be set based on a criterion that no valid sector exists in a unit.

Figure 8:
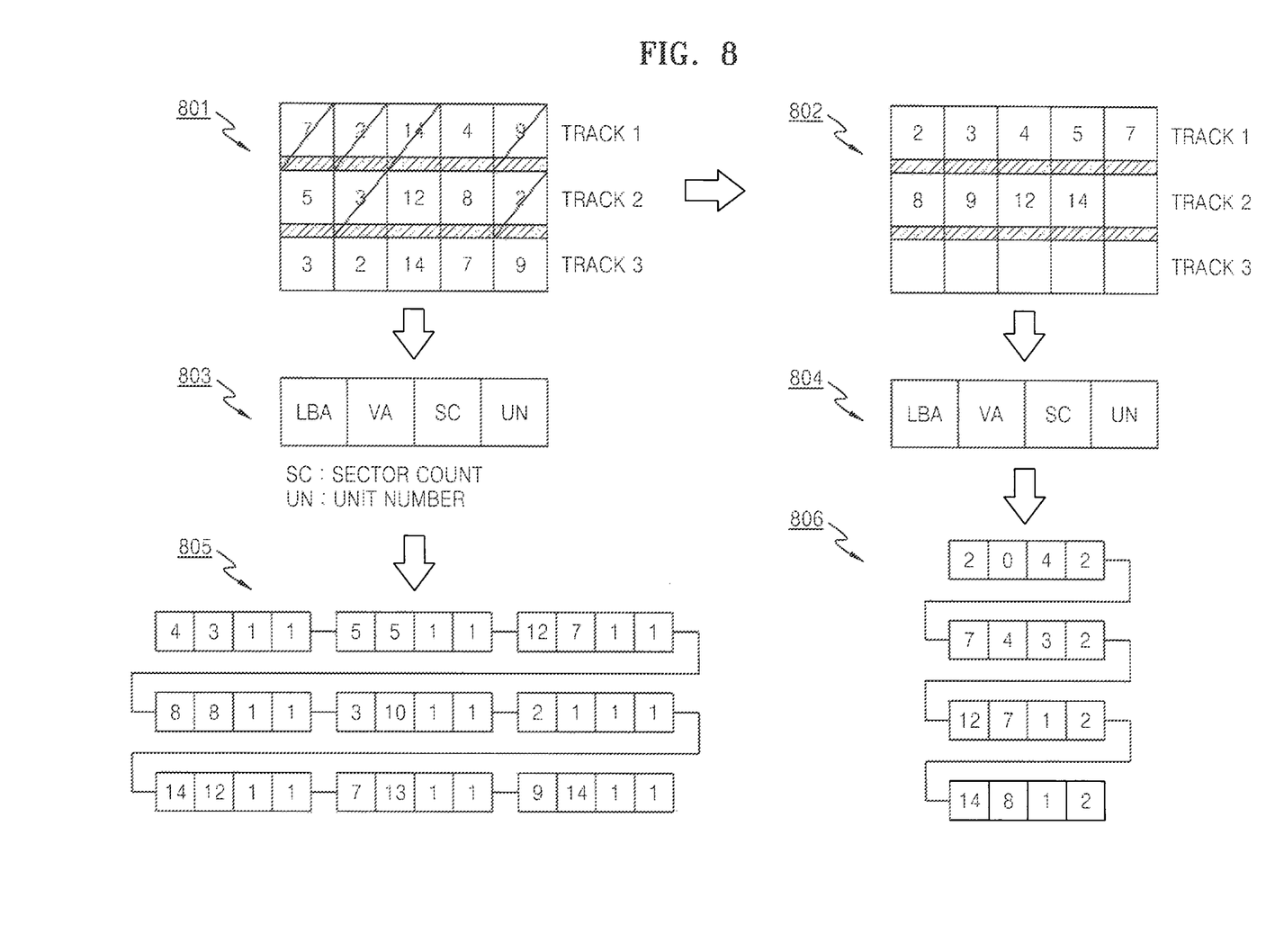
FIG. 8 illustrates rewrite of shingle-written data performed by the storing medium access method illustrated in FIG. 7 according to exemplary embodiments of the present general inventive concept.

FIG. 8 illustrates rewrite of shingle-written data performed by the storing medium access method illustrated in FIG. 7. If the method illustrated in FIG. 7 and described herein is applied to a shingle-written unit 801 of FIG. 8, the critical value A in operation S702 can be set to 5. If the critical value A is set to 5, the unit 801 of FIG. 8 can be a unit of which a count value of invalid sectors is greater than 5.

When a unit in which a count value of invalid sectors is greater than A exists, the controller 220 can allocate one of the valid units included in the selected zone as a new unit in operation S703 in FIG. 7. In FIG. 8, a unit 802 is the newly allocated unit.

In operation S704 illustrated FIG. 7, the controller 220 can access the storing medium 230 so that valid data written on active sectors in the unit of which a count value of invalid sectors is greater than A is rewritten on the newly allocated unit based on shingle write in the order of LBAs. That is, the controller 220 can access the storing medium 230 so that data is rewritten on the new unit based in the order of LBAs such as in the unit 802 illustrated in FIG. 8.

The controller 220 can update the mapping table of the selected zone in operation S705 illustrated in FIG. 7. Information on the mapping table can be reduced (e.g., as illustrated by reference numeral 806 in FIG. 8) as illustrated in FIG. 8 by the rewrite performed in operation S704. That is, if mapping information between an LBA and a VA in the unit of sector included in a unit includes LBA, VA, Sector Count (SC), and Unit Number (UN) like reference numerals 803 and 804 of FIG. 8, mapping information between an LBA and an VA in the unit of sector for the unit 801 is the same as illustrated in reference numeral 805. However, when only valid data is rewritten in the order of LBAs using the new unit 802, the mapping information between an LBA and a VA in the unit of sector is reduced as illustrated in reference numeral 806 of FIG. 8. As described above, since an amount of metadata of the storing medium 230, which is included in each mapping table, is reduced, the data storage device 200 can manage metadata of the storing medium 230.

The controller 220 can update the mapping table so that the previous unit that has been determined in operation S702 to have a count value of invalid sectors that is greater than A can be set as a valid unit.

When it is determined in operation S702 that a unit having a count value of invalid sectors that is greater than A does not exist from among the units included in the zone, the controller 220 may return to operation S701 and can select another zone.

Figure 9:
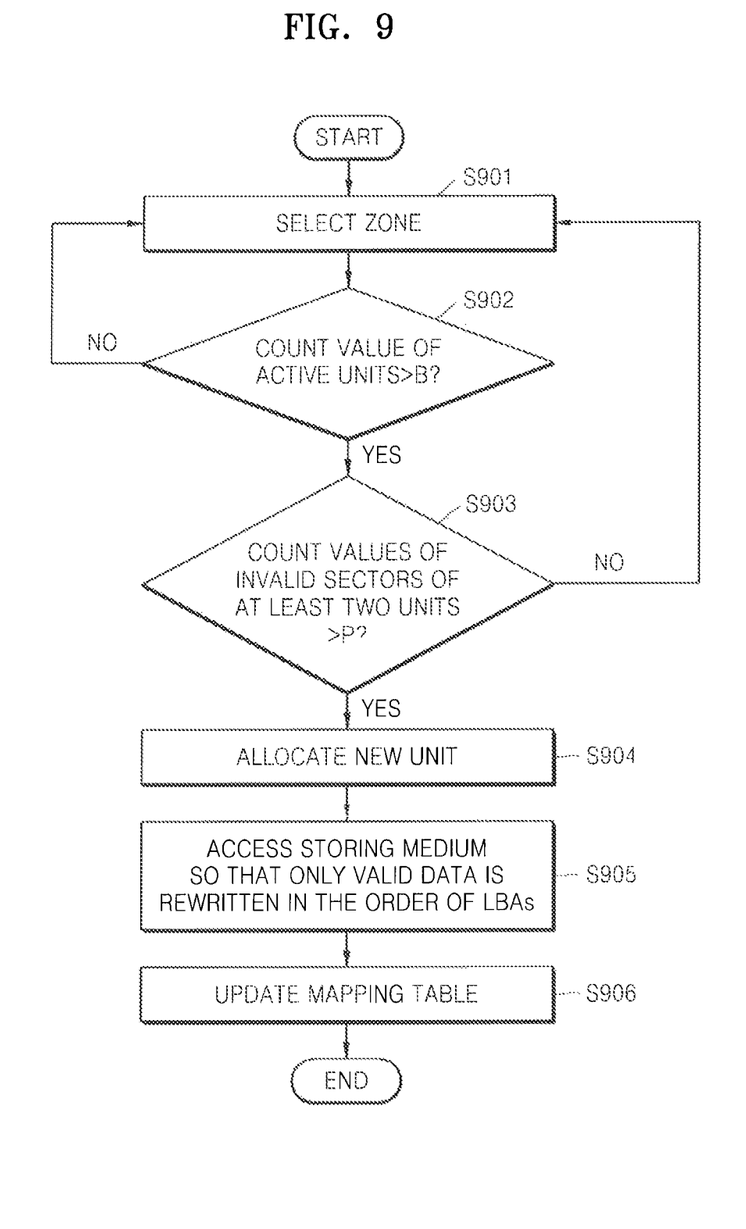
FIG. 9 is a flowchart illustrating a storing medium access method when rewriting shingle-written data in an idle time of a data storage device according to exemplary embodiments of the present general inventive concept.

The controller 220 can operate according to the method illustrated in the flowchart of FIG. 9 when accessing the storing medium 230 to rewrite data written on the storing medium 230 so that the data is rearranged using a mapping table per zone.

FIG. 9 is a flowchart of a storing medium access method when rewriting shingle-written data in an idle time of a data storage device according to exemplary embodiments of the present general inventive concept. FIG. 9 illustrates that if a count value of active units from among units included in a selected zone is greater than a critical value B, data is rewritten by allocating a new unit according to a result of checking whether at least two units of which a count value of invalid sectors is greater than a critical value P exist.

That is, referring to FIG. 9, when the controller 220 selects a zone in operation S901, the controller 220 can determine in operation S902 whether a count value of active units included in the selected zone is greater than the critical value B. When the count value of active units included in the selected zone is not greater than the critical value B, the controller 220 may return to operation S901 and to select another zone. However, when the count value of active units included in the selected zone is greater than the critical value B, the controller 220 can determine in operation S903 whether at least two units of which a count value of invalid sectors is greater than the critical value P exist in the selected zone. The critical value P can be set in the same condition as the critical value A illustrated in FIG. 7 and described above. The critical value B can be set to an integer less than the maximum number of units included in the zone.

As a checking result, when at least two units of which a count value of invalid sectors is greater than the critical value P exist, in operations S904, 905, and 906, the controller 220 can allocate a new unit, can access the storing medium 230 so that only valid data is rewritten in the order of LBAs in the newly allocated unit as illustrated in FIG. 7, and can update the mapping table of the selected zone. When at least two units of which a count value of invalid sectors is greater than the critical value P do not exist, the controller 220 can return to operation S901 to select another zone.

Figure 10:
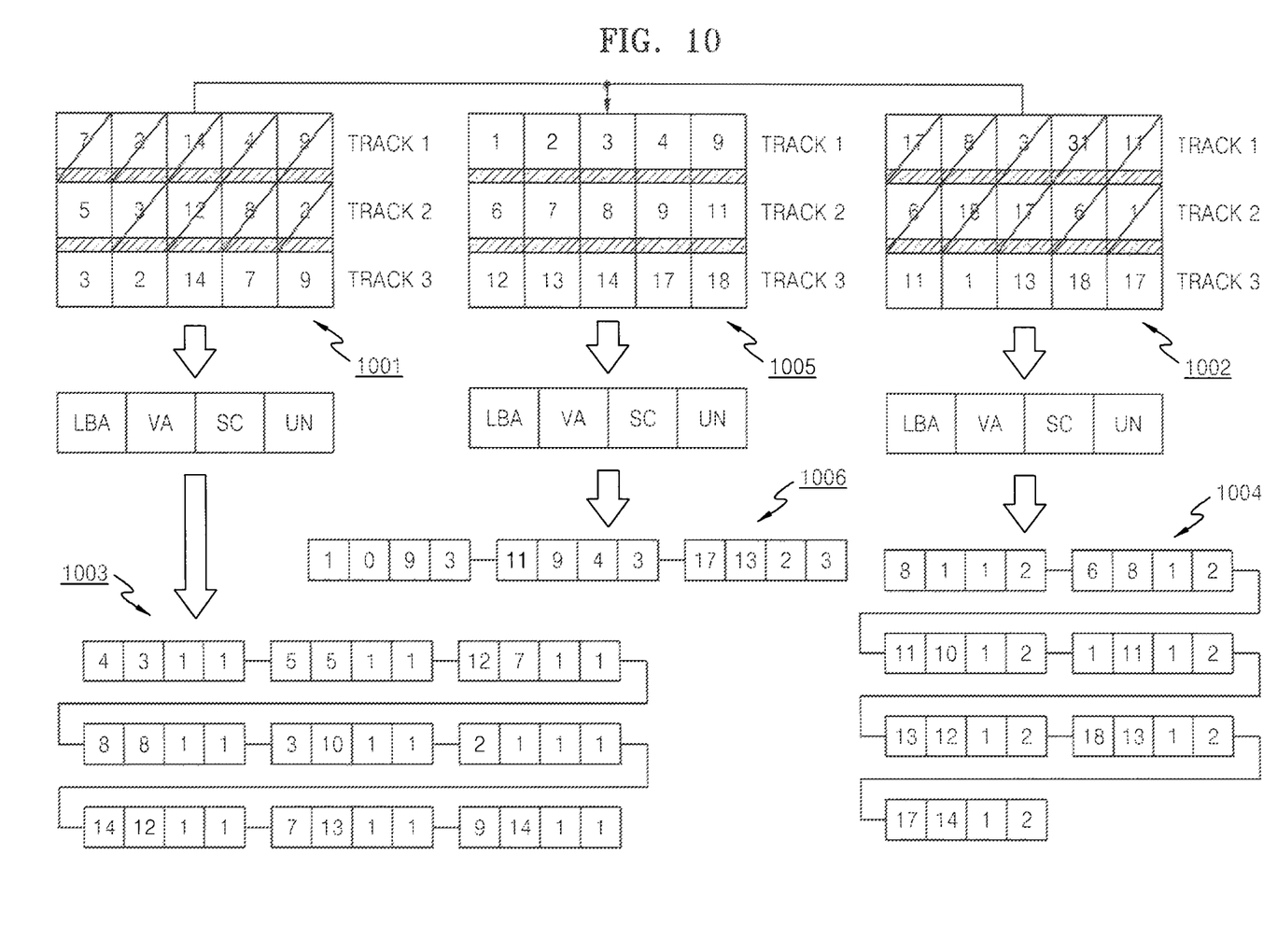
FIG. 10 illustrates a rewrite of shingle-written data performed by the storing medium access method illustrated in FIG. 9 according to exemplary embodiments of the present general inventive concept.

FIG. 10 illustrates a rewrite of shingle-written data performed by the storing medium access method illustrated in FIG. 9 and described above, where data written on two units is rewritten on a single unit. Units 1001 and 1002 of FIG. 10 can be units of which a count value of invalid sectors is greater than the critical value P. Mapping information between LBAs and VAs of the unit 1001 is illustrated in reference numeral 1003, and mapping information between LBAs and VAs of the unit 1002 is illustrated in reference numeral 1004. If valid data from among data rewritten on the units 1001 and 1002 are written on a newly allocated unit 1005 in the order of LBAs, mapping information between LBAs and VAs of the unit 1005 is illustrated in reference numeral 1006. As illustrated in FIG. 10, by rewriting data in the order of LBAs of valid data, mapping information included in a mapping table can be reduced.

Figure 11:
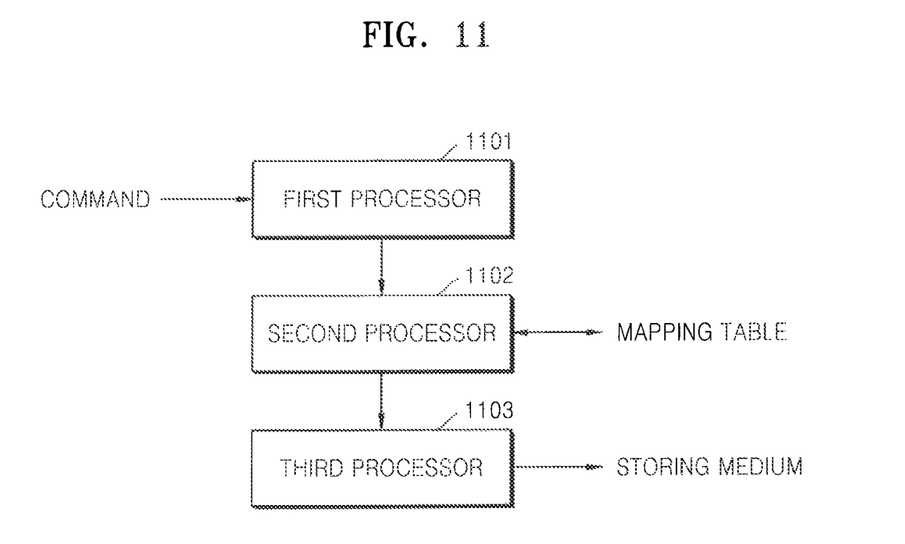
FIG. 11 illustrates a detailed functional block diagram of a controller illustrated in FIG. 2 according to exemplary embodiments of the present general inventive concept.
Figure 12:
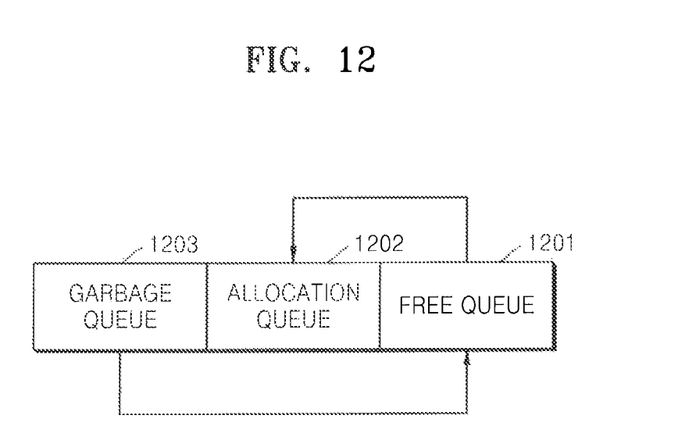
FIG. 12 is a detailed functional block diagram of a second processor illustrated in FIG. 11 according to exemplary embodiments of the present general inventive concept.

To perform the operation of the controller 220 described above, the controller 220 can include, as illustrated in FIG. 11, a first processor 1101 to receive a command from the host interface 210 and to extract an LBA from the received command, a second processor 1102 to allocate a VA to the received LBA using a mapping table, and a third processor 1103 to access the storing medium 230 by converting the allocated VA to a real address. The third processor 1103 can include a component to access the storing medium 230. The component can include, for example, a storing medium driver and a read/write channel circuit. The first processor 1101, second processor 1102, and the third processor 1103 may be a central processing unit, a filed programmable gate array, a programmable logic device, a application specific integrated circuit, or any other suitable processor to carry out the exemplary embodiments of the present general inventive concept as disclosed herein.

When the storing medium 230 is a hard disk, the controller 220 can be a HDD Translation Layer (HTL). When the processors illustrated in FIG. 11 are represented with layers, the first processor 1101 can be represented with a HDD Interface Layer (HIL), the second processor 1102 can be represented with a Virtual Mapping Layer (VML), and the third processor 1103 can be represented with a HDD Physical Layer (HPL).

The second processor 1102 can include a mapping table. In addition, the second processor 1102 can allocate a VA to an LBA and invalidate, validate, or activate sectors and units by including a free queue 1201, an allocation queue 1202, and a garbage queue 1203. In exemplary embodiments of the present general inventive concept, validation means a state of enabling data write, activation means a state where data has been written, and invalidation means a state where written data is invalid. Invalid sectors and invalid units can be set as valid sectors and valid units by the rewrite described in FIGS. 7 to 10. Accordingly, the rewrite described in FIGS. 7 to 10 can be represented with garbage collection.

The storing medium 230 can be a storing medium in which shingle write can be performed, such as a hard disk. However, the storing medium 230 can be defined as a Head Disc Assembly (HDA) including at least one disc rotated by a spindle motor. The disc included in the HDA can be a magnetic disc.

The mapping table illustrated in FIGS. 2 to 10 and described above can be metadata of the storing medium 230.

The exemplary embodiments of the present general inventive concept can be implemented as a method, an apparatus, and a system. The present general inventive concept can also be embodied as computer-readable codes on a computer-readable medium. The computer-readable medium can include a computer-readable recording medium and a computer-readable transmission medium. The computer-readable recording medium is any data storage device that can store data as a program which can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network coupled computer systems so that the computer-readable code is stored and executed in a distributed fashion. The computer-readable transmission medium can be transmitted through carrier waves or signals (e.g., wired or wireless data transmission through the Internet). Also, functional programs, codes, and code segments to accomplish the present general inventive concept can be easily construed by programmers skilled in the art to which the present general inventive concept pertains.

While the present general inventive concept have been particularly illustrated and described with reference to exemplary embodiments thereof, it will be understood that various changes in form and details may be made therein without departing from the spirit and scope of the following claims.

What is claimed is:

1. A device comprising:
a data storage medium configured to store data in a shingled manner where one track at least partially overlaps an adjacent track;
a controller configured to:
receive a write command including a Logical Block Address (LBA);
allocate a virtual address corresponding to a specific data sector of the data storage medium to the LBA using a mapping table;
manage the mapping table by zone, a zone includes a plurality of units, a unit includes a plurality of tracks, and a track includes a plurality of data sectors;
access the data storage medium using the allocated virtual address;
sequentially write data corresponding to the write command on the data storage medium using the mapping table based on the LBA;
when the device is in an idle state,
rewrite valid data written to at least one unit to a new unit using the mapping table; and
update the mapping table to designate virtual addresses corresponding to the valid data on the at least one unit as containing invalid data, and designate virtual addresses corresponding to the valid data on the new unit as containing active data.

2. The device of claim 1, further comprising the mapping table includes the LBA, the virtual address, a unit containing the virtual address, and a last written sector in the unit.

3. The device of claim 1, comprising the controller further configured to:
sequentially write data associated with the write command to data sectors immediately following a last written sector identified on the mapping table; and
when the mapping table contains a previously allocated virtual address allocated to the LBA, update the mapping table to designate the previously allocated virtual address as containing invalid data.

4. The device of claim 1, comprising the controller further configured to rewrite the valid data in the order of LBAs corresponding to the valid data.

5. The device of claim 1, further comprising the at least one unit has a count value of invalid sectors greater than a predetermined critical value.

6. The device of claim 1, comprising the controller further configured to:
determine whether an active unit currently designated to receive write commands is full;
allocate a new unit as the active unit when the currently designated active unit is full; and
allocate a virtual address corresponding to a sector on the new unit to the LBA using the mapping table.

7. The device of claim 1, comprising the controller further configured to:
determine whether a number of units containing active data for a selected zone exceeds a unit threshold;
when the number of units exceeds the unit threshold, determine whether at least two units of the units containing active data have a count value of invalid sectors greater than a predetermined critical value; and
when the at least two units have a count value greater than the critical value, rewrite valid data from the at least two units to a new unit using the mapping table.

8. A method comprising:
- managing a mapping table on a zone by zone basis, a zone including a plurality of units, a unit including a plurality of tracks, and a track including a plurality of sectors;
- searching the mapping table based on a Logical Block Address (LBA) included in a received write command;
- sequentially writing data associated with the write command to a data storage medium in a singled manner where one track at least partially overlaps an adjacent track based on the mapping table;
- when a device including the data storage medium is in an idle state, rewriting, in an order based on LBAs, valid data currently written to at least one unit to a new unit using the mapping table; and
- updating the mapping table to designate virtual addresses corresponding to the valid data on the at least one unit as containing invalid data, and designate virtual addresses corresponding to the valid data on the new unit as containing active data.

9. The method of claim 8, further comprising the mapping table includes the LBA, the virtual address, a unit containing the virtual address, and a last written sector in the unit.

10. The method of claim 8, wherein sequentially writing data to the data storage medium comprises:
- allocating a virtual address corresponding to a specific data sector of the data storage medium to the LBA using the mapping table; and
- accessing the data storage medium using the allocated virtual address.

11. The method of claim 10, further comprising:
- sequentially writing data associated with the write command to data sectors immediately following a last written sector identified on the mapping table.

12. The method of claim 11, further comprising:
- determining after allocating the virtual address whether a previously allocated virtual address to the LBA exists in the mapping table; and
- when the previously allocated virtual address to the LBA exists in the mapping table, update the mapping table to designate the previously allocated virtual address as containing invalid data.

13. The method of claim 8, further comprising the at least one unit has a count value of invalid sectors greater than a predetermined critical value.

14. The method of claim 8, further comprising:
- determining whether a number of units containing active data for a selected zone exceeds a unit threshold;
- when the number of units exceeds the unit threshold, determining whether at least two units of the units containing active data have a count value of invalid sectors greater than a predetermined critical value; and
- when the at least two units have a count value greater than the critical value, rewriting valid data from the at least two units to a new unit using the mapping table.

15. A device comprising:
- a data storage medium configured to store data in a shingled manner where one track at least partially overlaps an adjacent track;
- the data storage medium includes a plurality of units, each unit including a plurality of tracks, each track including a plurality of data sectors, a physical address corresponding to a data sector;
- a first processor configured to receive a command including a Logical Block Address (LBA);
- a second processor configured to:
  - use a mapping table to allocate a virtual address to the LBA;
  - invalidate a first unit by placing the first unit in a garbage queue using the mapping table, the garbage queue configured to indicate units having a state designating data written to a respective unit is invalid;
  - validate a second unit by placing the second unit in a free queue using the mapping table, the free queue configured to indicate units having a state designating a respective unit as enabled for writing; and
  - activate a third unit by placing the third unit in an allocation queue using the mapping table, the allocation queue configured to indicate units having a state designating data written to a respective unit is valid; and
- a third processor configured to access the data storage medium by converting the virtual address to a physical address of the data storage medium.

16. The device of claim 15 further comprising:
the second processor further configured to:
- allocate the virtual address corresponding to a sector following a last-written sector of an allocated unit currently selected for writing when the allocated unit is not full;
- when the allocated unit is full,
  - move a new unit from the free queue to the allocated queue and allocate a virtual address corresponding to the first sector of the new unit;
  - update the mapping table to designate the new unit as currently selected for writing; and
  - update the mapping table to designate a sector corresponding to the allocated virtual address as the last-written sector.

* * * * *